UNITED STATES PATENT OFFICE.

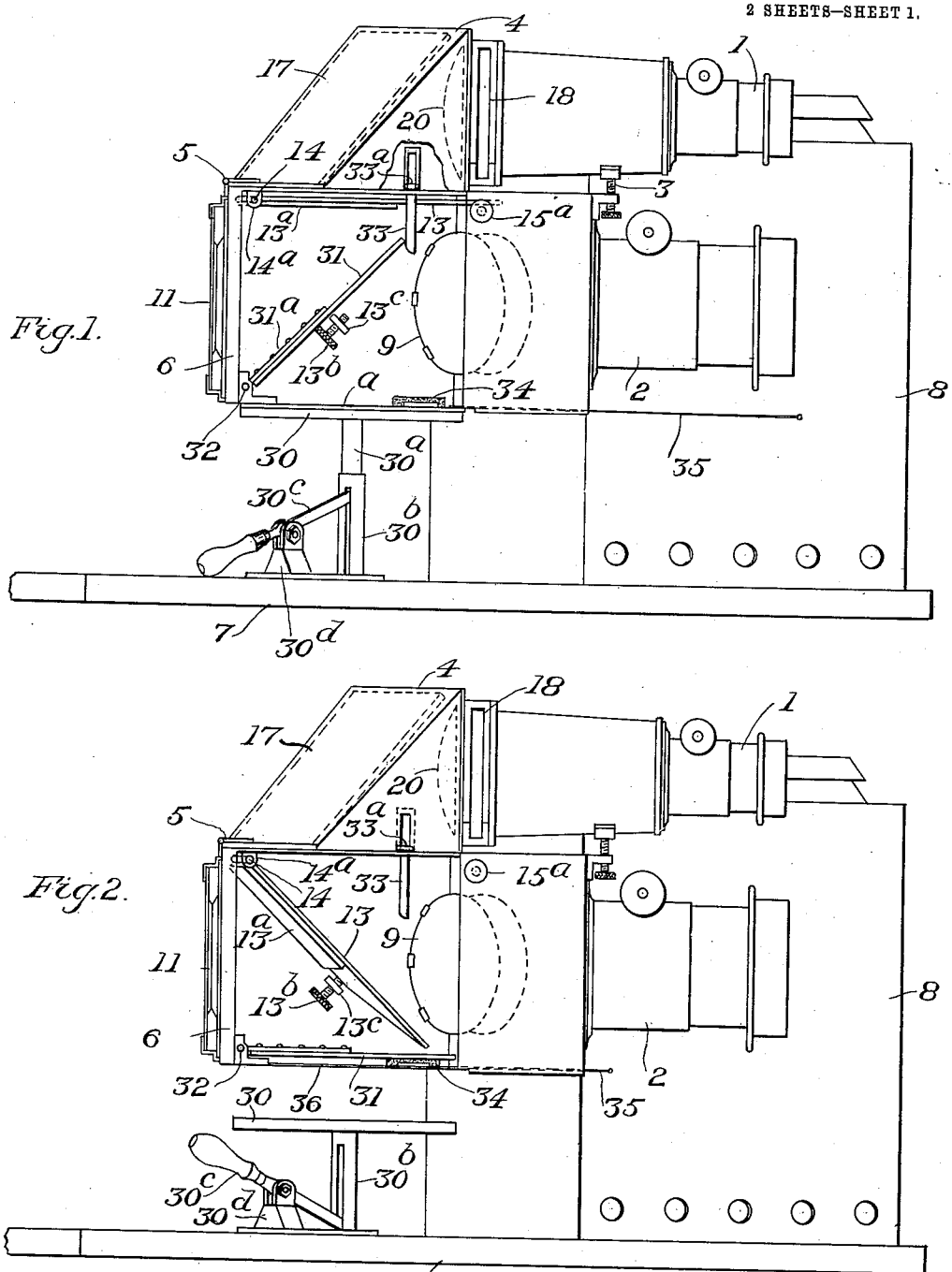

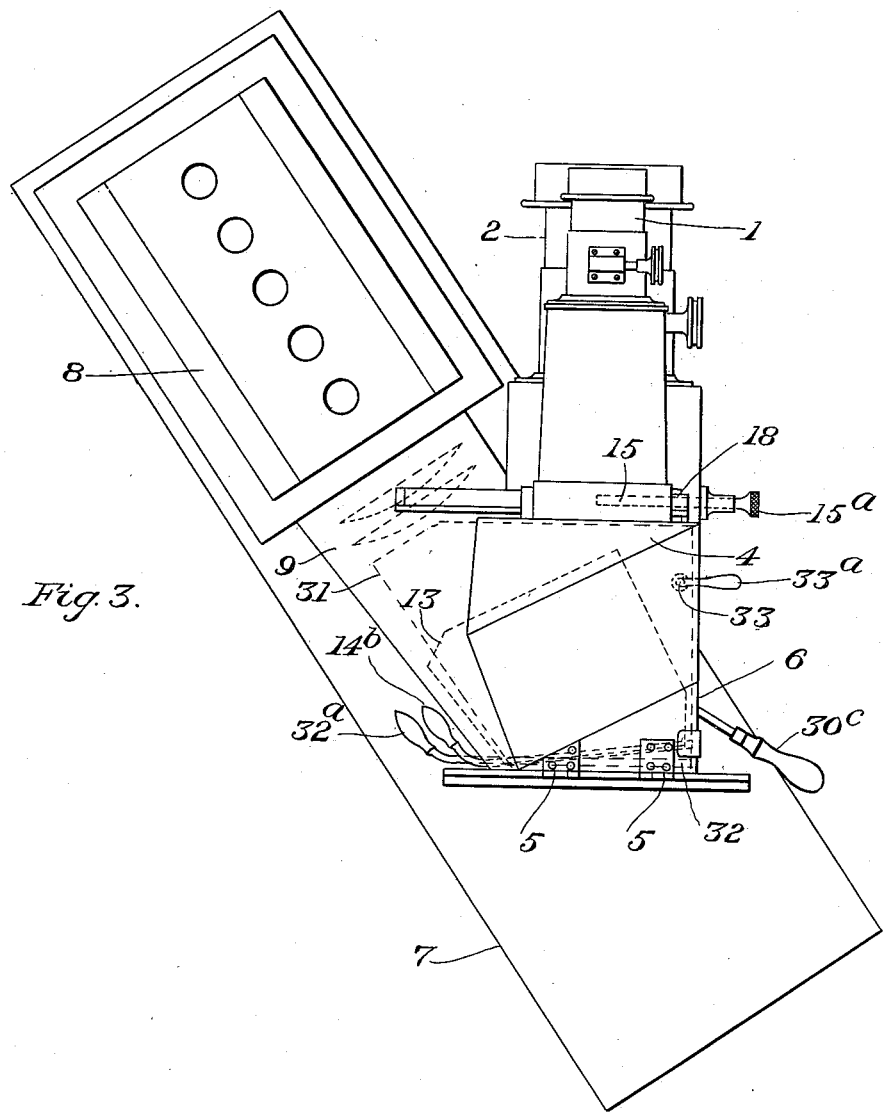

ALBERT T. THOMPSON, OF BROOKLINE, MASSACHUSETTS.

OPTICAL PROJECTION APPARATUS.

1,076,077.　　　Specification of Letters Patent.　　Patented Oct. 21, 1913.

Application filed March 20, 1913. Serial No. 755,641.

*To all whom it may concern:*

Be it known that I, ALBERT T. THOMPSON, a citizen of the United States, residing at Brookline, in the county of Norfolk, State of Massachusetts, have invented a certain new and useful Improvement in Optical Projection Apparatus, of which the following is a specification, reference being had therein to the accompanying drawings.

The invention is more particularly an improvement in means for optical projection from opaque objects, such for instance as drawings, pictures, post cards, photographs, lithographs, and small objects.

The general object of the invention is to provide means for quickly changing or dissolving from one opaque object to another.

In the preferred mode of embodiment the invention provides for changing or dissolving from a picture or the like, or other object, occupying a vertical position to one occupying a horizontal position, or vice versa.

A second object of the invention is to accomplish the preceding object in an apparatus providing also for projection from transparent material, at will, interchangeably with opaque projection.

An embodiment of the invention is shown in the drawings, Figures 1 and 2 being side elevations of an apparatus containing the said embodiment, with the door of the dark chamber removed, and Fig. 3 being a plan view thereof, with the intercepting mirror 13 in its working position shown in Fig. 2.

Having reference to the drawings,—the apparatus shown comprises two objectives, 1, 2, both facing in the same direction, and with their axes substantially parallel, so as to project upon the same screen or surface. In the present instance one of the said objectives is located vertically over the other, which arrangement has various advantages, and is convenient. At 3, Figs. 1 and 2, is an adjusting screw in connection with the upper objective, by which the position of the axis of the latter may be adjusted as may be required to cause the image projected through such objective to correspond in position upon the screen or other surface as closely as may be desired with that from the other objective, the casing 4 at the rear of the upper objective pivoting upon its hinge connection 5 with the casing of the dark-chamber 6 at the rear of the lower objective. At 7 is the base or platform of the apparatus. At 8 is the lamp-house, within which is a lamp of suitable character, usually an electric-arc lamp. At 9 is a condenser-lens arrangement by which the rays of light from the lamp are brought into parallelism and formed into a beam, and directed to the field for opaque material at the rear of the lower objective 2, an upright holder for such material being indicated at 11. The disposition of the beam-directing lens-arrangement is such as to direct the beam in an oblique direction rearward toward the said field. In Figs. 1 and 2 the door closing one side of the dark-chamber 6 is removed, exposing the interior. Fig. 2 shows an intercepting mirror 13 occupying an oblique position between the holder 11 for opaque material and the objective 2. While the apparatus is being used for opaque projection from material in said holder 11 the said intercepting mirror is swung up into a horizontal position at the top of dark-chamber 6 as in Fig. 1, it being attached to a carrier 13$^a$ that is hinged to the upper portion of the casing of the dark-chamber 6, to permit it to be turned from its inclined position in Fig. 2 to the horizontal position shown in Fig. 1, and vice versa. The hinging is effected by means of a rod 14 that is attached to the said holder and is mounted in bearings in lugs 14$^a$ projecting from the casing. For convenience in swinging the intercepting mirror from one position to the other, the rod 14 is extended to the exterior of the dark-chamber and there bent to form a crank-handle 14$^b$ as shown in Fig. 3. A longitudinally movable pin 15 is shown employed to retain the intercepting mirror in its elevated horizontal position. This pin has a head 15$^a$ at its outer end, which may be taken hold of by hand to pull out the pin so as to permit the mirror 13 to be raised to its horizontal position, and then push the pin back in beneath the mirror to hold it elevated. Any other approved means of supporting and latching the mirror 13 in withdrawn position may be employed instead of the said pin. So long as the mirror 13 occupies its elevated position, as in Fig. 1, it is out of the path of the beam on the way from condenser-lens 9 to the field for the opaque material at holder 11, and also out of the path of the rays on their way from the said material to and through the objective 2. When the intercepting mirror is swung down into its position in Fig. 2, in which it rests against one end of adjusting screw 13<sup>b</sup> working in a threaded hole tapped in a lug 13<sup>c</sup> projecting from one side-wall of the casing of the dark-chamber, it crosses the path of the beam of light on the way from the lens-arrangement 9. The obliquity of the said mirror in this position is such as to deflect the beam at an angle away from the axis of objective 2 and across the axis of objective 1. A second mirror at 17 within the casing 4 receives the deflected beam, and reflects it a second time, sending it now in the direction of the axis of the objective 1, and through the latter. By adjustment of the screw 13<sup>b</sup> the angle of the intercepting mirror is varied, as required, to cause the deflected beam to fall properly upon the said mirror 17.

At 18 is a slide-stage for transparent material between the objective 1 and the second mirror, 17, into which such material is placed when the apparatus is employed for transparent projection.

It will be observed that the apparatus as thus far described may be utilized for either opaque projection or transparent projection upon the same screen or surface, simply by causing the intercepting mirror to assume either its withdrawn or idle position, or its intercepting and deflecting position.

Between the second mirror, 17, and the objective 1, and at the rear of the slide-stage 18, is located a condenser-lens 20, by which the beam deflected by the intercepting mirror and again reflected by the mirror 17 is collected and again condensed prior to its passage forward through the lantern slide.

In carrying the invention into effect I provide in conjunction with the objective lens 2 a second object-holder for opaque material, located intermediate said lens and the object-holder 11, and I provide further a mirror and means for supporting it when required in a working position in which it will receive the beam of light from the lamp, reflect it at an angle to the axis of the objective lens 2 upon the object or objects applied to the said second object-holder, and reflect the image of such object or objects to and through the said objective lens. The second object-holder is here shown as a horizontal table 30 located beneath the dark-chamber, and supported by means of a depending stem 30<sup>a</sup> occupying the interior of a tubular standard 30<sup>b</sup>. The said table is made vertically movable to enable it to be depressed as in Fig. 2 to receive thereon a book, card, picture or other object, and to be then raised to place the said object, as at a, Fig. 1, in the required position at the bottom of the dark-chamber. In the fully elevated position of the table it closes the bottom-opening of the dark-chamber. For convenience in operating the table 30, a hand-operated lever 30<sup>c</sup> is provided, pivoted upon a standard 30<sup>d</sup> and engaged with the stem of the table, the engaging portion of the lever working in a vertical slot in the tubular standard 30<sup>b</sup>.

Mirror 31 is caused to occupy its working position shown in Fig. 1 only when it is desired to project the image of the object or objects applied to the object-holder 30. When it is desired to project the image of opaque material applied to object-holder 11, the mirror 31 is removed from its working position. The manner and means of providing for supporting the mirror 31 in the said working position, and for its removal therefrom, may vary in practice. Preferably, however, I provide therefor by mounting the said mirror to swing upon an axis 32 located at the lower rear corner of the dark-chamber. This axis is constituted by a rod fixed to the carrier 31<sup>a</sup> of the mirror and journaled in suitable bearings in connection with the casing of the dark-chamber. The said rod is extended to the outside of the dark-chamber at one side of the latter, and furnished with an operating handle 32<sup>a</sup>, Fig. 3. By taking hold of this handle the mirror 31 may be operated from the exterior of the dark-chamber, without opening the door of the latter, and thus by means of the handle the said mirror may be swung up into its working position as in Fig. 1, or down into its idle position as in Fig. 2. To keep the mirror 31 in its working position, a vertically sliding spring-actuated latch or bolt 33 is provided. This latch or bolt is arranged at the top of the dark-chamber, at one side thereof. Its lower end hangs down across the path of the free edge of mirror 31, so that as said mirror is swung up into its working position the said edge strikes against the said lower end and lifts the latch or bolt until the edge slips past, whereupon the latch or bolt drops down in front of the edge, as in Fig. 1, so as to detain the mirror from descending. To enable the latch or bolt 33 to be raised to free the mirror 31, a thumb-piece 33<sup>a</sup> projects out through a narrow slit in the casing 4 into position to be reached by the operator. The operator first takes hold of handle 32<sup>a</sup> with one hand and with the other acts upon thumb-piece 33<sup>a</sup> to raise the latch or bolt 33. He controls the descent of the mirror by means of the handle 32<sup>a</sup>. In its idle position the mirror 33 rests upon a felt pad 34.

It will be perceived that the two mirrors 13 and 31 are mounted so as to enable them to be swung alternately and thereby interchangeably into position to receive the beam from the lamp, and also so as to enable them both to be swung into idle or retracted positions, clear of the path of the said beam. Thereby provision is made for opaque projection from material in the object-holder 11 in line with the objective-lens 2, or from opaque material upon the object-holder 30, and also for projection from transparent material at the slide-stage 18. This enables the operator to change or dissolve quickly from one opaque object to another, or to a view from the transparent material, or vice versa.

For the purpose of preventing the escape of light at the bottom of the dark-chamber when table 30 is lowered, a slide or shutter 35 is provided. This slide or shutter occupies a horizontal position in guideways 36 located below the idle position of the mirror 31. It may be caused to close the opening at the bottom of the chamber entirely after the table 30 has been lowered, or it may be caused to close such opening only part way so as to leave a narrow opening or slit at the extreme back of the dark-chamber to permit sufficient light to issue from the chamber to illuminate the lowered table enough to facilitate the application, adjustment, and inspection of material upon the same. When the table is raised the shutter or slide is withdrawn forwardly, as in Fig. 1.

I claim as my invention,—

1. In an optical projection apparatus, in combination, an objective lens, a holder for opaque projection-material located in line with the objective lens for direct projection, and means for directing a beam of light upon the said material, a second holder for opaque projection-material out of line with the axis of the objective lens, a mirror, and means for removably supporting said mirror in position for intercepting said beam, reflecting it upon the material applied to the latter object-holder, and reflecting the image of such material into and through the objective lens, whereby provision is made for changing or dissolving from one object to another.

2. In an optical projection apparatus, in combination, an objective lens, a holder for presenting opaque material in upright position in line with the objective lens for direct projection, and means for directing a beam of light upon the said material, a holder for presenting opaque material in horizontal position out of line with the axis of the objective lens, a mirror, and means for removably supporting said mirror in position for intercepting said beam, reflecting it upon the material applied to the latter object-holder, and reflecting the image of such material into and through the objective lens, whereby provision is made for changing or dissolving from one object to another.

3. In an optical projection apparatus, in combination, an objective lens, a holder for opaque projection-material located in line with the objective lens for direct projection, and means for projecting a beam of light upon the said material, a second holder for opaque projection-material out of line with the axis of the objective lens, a mirror mounted and adapted to be swung from a retracted position into position for intercepting said beam, reflecting it upon the material applied to the latter object-holder, and reflecting the image of such material into and through the objective lens, and to be swung from said intercepting position to said retracted position, whereby provision is made for changing or dissolving from one object to another.

4. In an optical projection apparatus, in combination, an objective lens, a holder for presenting opaque material in upright position in line with the objective lens for direct projection, and means for directing a beam of light upon the said material, a holder for presenting opaque material in horizontal position out of line with the axis of the objective lens, a mirror mounted to swing into an inclined position in which it intercepts said beam, reflects it upon the material applied to the latter object-holder, and reflects the image of such material into and through the objective lens, and also adapted to be swung into an idle retracted position to provide for direct projection from the said upright material.

5. In an optical projection apparatus, in combination, an objective lens, a dark chamber, a holder for presenting opaque material in upright position in line with the objective lens for direct projection, and means for directing a beam of light upon the said material, a second holder for opaque material out of line with the axis of the objective lens, a mirror within the dark chamber, and means operable from outside the closed dark chamber for shifting the mirror from a retracted position into position to intercept the said beam, reflect it upon the latter material, and reflect the image of such material into and through the objective lens, and for shifting the mirror from said intercepting position into the retracted position to permit direct projection from the material applied to the holder first mentioned.

6. An optical projection apparatus having two objectives facing in the same direction, means for supporting transparent material in line with one objective, a field adapted to be occupied by opaque projection material in line with the other objective for direct opaque projection, means for directing a beam of light obliquely toward such field to illuminate the said material for opaque projection, a second field for opaque material out of line with the latter objective, a mirror, means for removably supporting it in position to intercept the said beam, reflect it upon the latter opaque material, and reflect the image of such material into and through such objective, a second mirror adapted to occupy a withdrawn position during use of the apparatus for opaque projection and adapted to be interchanged with the first mirror in intercepting relations with said beam and so as to reflect the beam at an angle to the axes of the objectives, and a third mirror which receives the thus reflected beam and sends it through the transparent material and the other objective when the apparatus is used for transparent projection.

7. An optical projection apparatus having two objectives facing in the same direction, one above the other, means for supporting transparent material in line with the upper objective, a field adapted to be occupied by opaque projection material in line with the lower objective for direct opaque projection, means for directing a beam of light obliquely toward such field to illuminate the said material for opaque projection, a second field for opaque material below the axis of the lower objective, a mirror adapted to occupy an idle position below the said axis and to be swung from such position into an inclined position in which it intercepts the said beam, reflects it downward to the said second field, and reflects the image of the material occupying such field forward through the lower objective, a mirror adapted to occupy an idle position above the axis of the lower objective and to be swung from such position into an inclined position in which it intercepts the said beam and reflects it upward, and a third mirror which receives the upwardly reflected beam and sends it through the transparent material and the upper objective when the apparatus is used for transparent projection.

In testimony whereof I affix my signature in presence of two witnesses.

ALBERT T. THOMPSON.

Witnesses:
CHAS. F. RANDALL,
NATHAN B. DAY.